United States Patent [19]

King

[11] 4,270,052

[45] May 26, 1981

[54] RADIOACTIVE GAS DOSE COMPUTER

[76] Inventor: Russell W. King, 1220 Via Granate, Sierra Madre, Calif. 91024

[21] Appl. No.: 49,644

[22] Filed: Jun. 18, 1979

Related U.S. Application Data

[63] Continuation of Ser. No. 853,476, Nov. 21, 1977, abandoned.

[51] Int. Cl.3 .......................... G01N 23/10; G21F 5/00

[52] U.S. Cl. .......................... 250/432 PD; 250/336

[58] Field of Search .......................... 250/432 PD, 364, 357, 250/336, 428, 432 R, 506, 328

[56] References Cited

U.S. PATENT DOCUMENTS

| | | | |
|---|---|---|---|
| 2,858,448 | 10/1958 | Brown | 250/336 |
| 3,717,760 | 2/1973 | Martin | 250/357 |
| 3,769,490 | 10/1973 | Czaplinski | 250/432 |
| 4,034,222 | 7/1977 | Azam et al. | 250/336 |
| 4,039,835 | 8/1977 | Colombetti | 250/432 PD |
| 4,084,097 | 4/1978 | Czaplinski et al. | 250/432 PD |
| 4,092,546 | 5/1978 | Larrabee | 250/432 R |

*Primary Examiner*—Bruce C. Anderson
*Attorney, Agent, or Firm*—Arthur V. Doble

[57] ABSTRACT

An electronic device for rapidly determining the volume of a radioactive gas needed to be removed from a closed container such that the removed volume will constitute a predetermined amount of radioactivity. Further, the device incorporates novel features including the use of a shielded valve assembly so that this determination, and actual withdrawal of the desired amount of radioactive gas may be accomplished without removing the closed container from its leaded radiation shield. The leaded radiation shield also serves as a shipping container for the multidose radioactive gas container, and is easily removed for periodic interchange with similarly shielded replacement radioactive source containers. The shielded valve assembly attaches to the top of the shielded closed container to facilitate withdrawal with minimum radiation exposure to the handling operator.

12 Claims, 3 Drawing Figures

DOSE VOLUME CHART

| Total Radioactivity | Volume Required For: 10 mCi Dose | 20 mCi Dose |
|---|---|---|
| 300 mCi | .9 cc | 1.8 cc |
| 290 | .9 | 1.9 |
| 280 | .9 | 1.9 |
| 270 | 1.0 | 2.0 |
| 260 | 1.0 | 2.1 |
| 250 | 1.0 | 2.2 |
| 240 | 1.1 | 2.3 |
| 230 | 1.1 | 2.4 |
| 220 | 1.2 | 2.5 |
| 210 | 1.3 | 2.6 |
| 200 | 1.3 | 2.8 |
| 190 | 1.4 | 2.9 |
| 180 | 1.5 | 3.1 |
| 170 | 1.6 | 3.3 |
| 160 | 1.7 | 3.6 |
| 150 | 1.8 | 3.8 |
| 140 | 1.9 | 4.2 |
| 130 | 2.1 | 4.5 |
| 120 | 2.3 | 5.0 |
| 110 | 2.5 | 5.6 |
| 100 | 2.8 | 6.3 |
| 90 | 3.1 | 7.1 |
| 80 | 3.6 | 8.3 |
| 70 | 4.2 | 10.0 |
| 60 | 5.0 | 12.5 |
| 50 | 6.3 | 16.7 |
| 40 | 8.3 | 25.0 |
| 30 | 12.5 | NA |
| 20 | 25.0 | NA |
| 10 | NA | NA |

FIGURE 3

RADIOACTIVE GAS DOSE COMPUTER

This application is a "continuation" application of that which was filed by applicant on Nov. 21, 1977, having Ser. No. 853,476 and is abandoned.

BACKGROUND OF THE INVENTION

1. Field of the Invention

This invention generally relates to instrumention for use in the field of measurement of radioactive materials, and more particularly relates to instrumention for the use thereof in the field of Medicine.

2. Prior Art

The use of radioactive gases in making certain medical tests on a patient has been on the increase in nuclear medical laboratories during recent years. When using radioactive gases from a multidose container, the determination of the volume of gas to withdraw for a desired patient dose is complicated by various factors such as half-life of the radioactive material, energy of the material, volume of the container, and attenuation of the gamma rays by the container walls. One method used is to place the source container in the well-type detector of an electronic device called a dose calibrator. If this device has been properly calibrated and adjusted to compensate for the energy of the isotope and attenuation due to the container walls, it will provide a reading of the radioactivity of the material contained therein. Knowing this, and the volume of the container, a calculation of the concentration can be made, and the volume required for the patient dose determined. Drawbacks to this method are (1) the container holding the radioactive gas must be removed from its leaded radiation shield thereby subjecting the operator to a radiation hazard, and (2) this procedure entails several mathematical calculations.

Another method used is to leave the gas container in its leaded radiation shield, remove an aliquot and measure it in the dose calibrator so calculations can be made to determine the amount and concentration of radioactivity in the gas container. Thereafter, the technician can maintain a logbook recording initial amount of radioactivity, time and amount of each withdrawal. If this record is maintained judiciously and a calculation made for radioactive decay just prior to each withdrawal, the following formula may be used to determine the required volume for a standard dose:

$$\text{Dose Volume (cc)} = \frac{\text{Dose (mCi)} \times \text{Container Vol. (cc)}}{\text{Radioactivity (mCi)} - \text{Dose (mCi)}}$$

Thus, because of both radiation hazard and complexity of calculations and record keeping, a simple device for storing substantial amounts of a radioactive gas, and rapidly determining the volume required for a standard patient dose, and removal thereof, would be useful in the Nuclear Medicine Departments of all hospitals.

SUMMARY OF THE INVENTION

Applicant herein has conceived of a new and useful apparatus for easily determining the volume of radioactive gas needed to be removed from a multidose shielded container to produce a predetermined dose of radioactivity, and which incorporates features for safe handling and easy withdrawal of the dose.

Further, the apparatus is designed such that the lead shielded multidose source container may be easily removed for periodic exchange with similarily shielded replacement radioactive gas sources.

The apparatus incorporates the use of a radiation-shield means for containing radioactive gas, which in this embodiment consists of a cylindrical lead housing with a locked-in multidose gas container that fits precisely into a positioning ring directly above a radiation detector. Identical radiation source containers may be received in the units to facilitate periodic replacement.

It further includes a radiation detector which is exposed to a geometrical portion of the gamma rays emitting from the bottom of the radiation source container. The detector is housed in lead to prevent operator exposure to gamma rays from the source, and also to prevent erroneous readings due to extraneous radiation.

Commonly-known electronic circuitry is used to amplify the signal information from the detector such that it may be displayed.

A reading of the amount of radioactivity in the source container is displayed on a calibrated meter face. The meter face also provides a scale for direct reading of the volume required to withdraw a standard patient dose.

Either a battery pack, or an A.C. source may be used as a power source for the electronic circuitry.

Shielded valve means, which in this embodiment consists of a slip-fit removable valve assembly that attaches to the top of the cylindrical multidose container housing, for easy withdrawal of a desired dose, is incorporated into the apparatus as one of its principal elements.

The present invention has several features of novelty over prior art for obtaining desired single dose amounts of a radioactive gas from a multidose container as hereinafter stated.

It is, therefore, an object of this invention to be able to directly determine the gas volume required for a single dose.

It is another object of this invention to provide a simple means of removal of the desired dose in a convenient way for immediate use.

It is still another object of this invention to provide the capability of both of the above without removing the multidose source container from its lead housing.

It is still another object of this invention to provide for interchange of multidose sources as required without removal of the radiation source container from its lead shipping container; this container becoming an integral part of the Radioactive Gas Dose Computer system.

DETAILED DESCRIPTION

Figure 1:
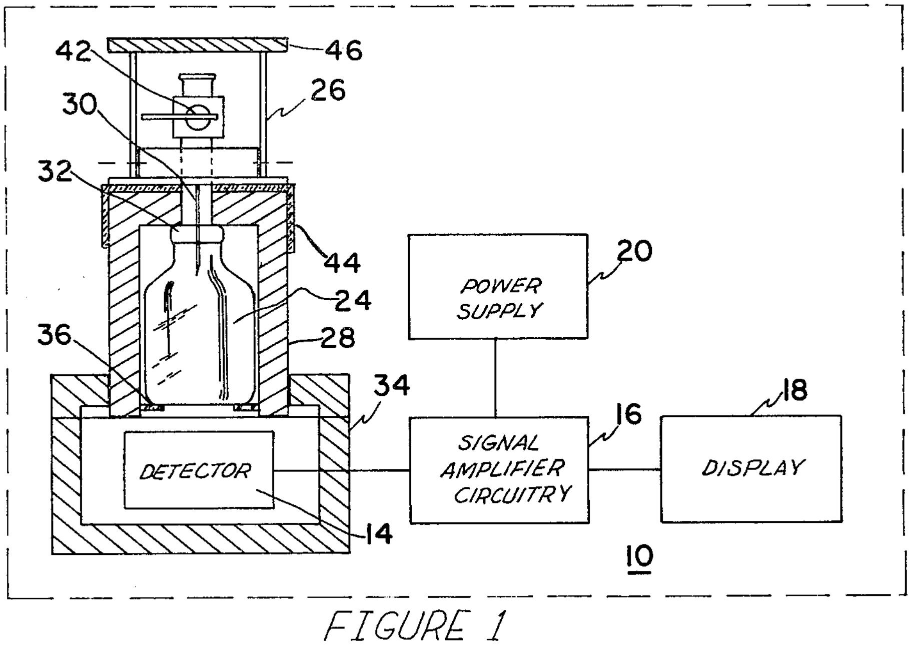
Figure 2:
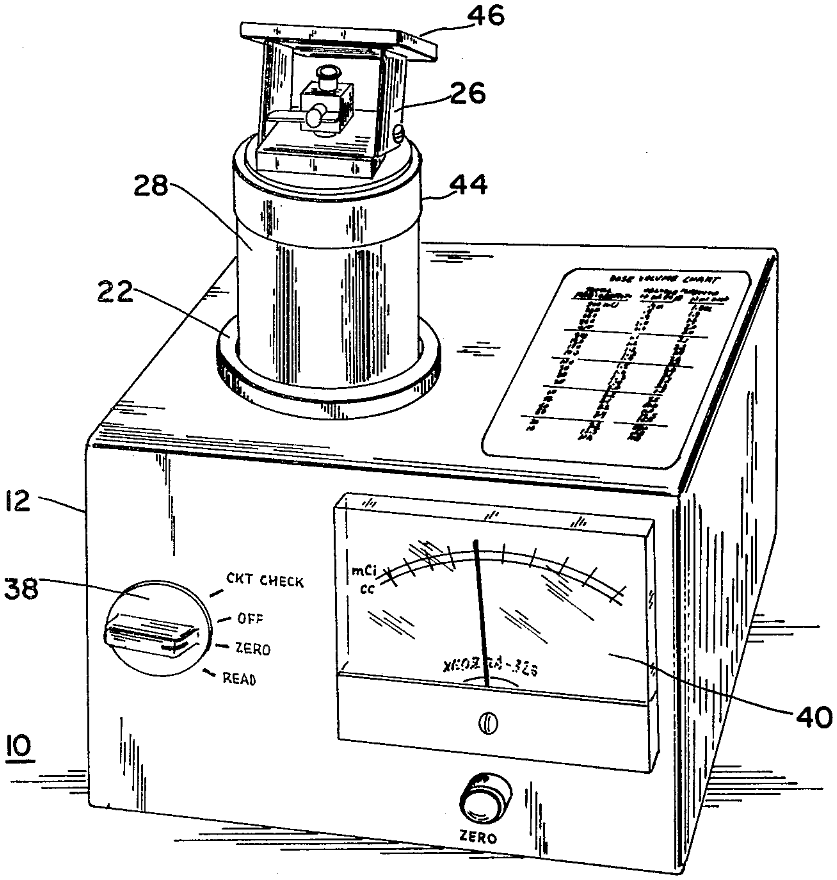

As depicted in FIG. 2, the entire apparatus 10 may be housed in an electronic cabinet 12 as small as 8 inches long by 5 inches high by 6 inches deep. With reference to blocks shown in FIG. 1, the cabinet contains a radiation detector 14 surrounded by shielding 34, signal amplified circuitry 16, meter display 18 and power supply 20. As shown in FIG. 2, in the top of the cabinet 12, directly above the detector, there is an opening with a plastic ring 22 which serves to accurately position the lead-shielded radioactive gas container 24. A shielded valve assembly 26 attaches to the top of the lead shield 28 such that a syringe needle 30 is inserted through a rubber septum into the gas container 24. The basic principle of operation is that if the radiation source container 24 is always of exactly the same physical construction, and it is placed in exactly the same position above the radiation detector 14, the output of the detector 14 can be amplified and displayed such that it will accurately provide a reading of the amount of radioactivity in the container 24 at any given time. Once the amount of radioactivity is known, the following equation can be used to determine the volume of gas to be withdrawn such that the dose will contain a preselected amount of radioactivity:

$$\text{Dose Volume (cc)} = \frac{\text{Dose (mCi)} \times \text{Container Vol. (cc)}}{\text{Radioactivity (mCi)} - \text{Dose (mCi)}}$$

If the volume of the source container 24 is maintained constant, from the equation it can be determined that for any specific standard dose of radioactivity, an inverse proportionality exists between dose volume and radioactivity. This proportionality may be used in any of several modes of presentation for display readout; one being a second scale on the face of a display meter 40.

With knowledge of the required volume in hand, to remove the desired radioactive dose from the multidose container 24, the operator draws this amount of air into a calibrated syringe, inserts it into the multidose container 24 through the shielded valve assembly 26, and withdraws an equal amount of gas into the same syringe. The addition of air in an amount equal to the volume of the dose withdrawn maintains the pressure (std) and volume within the multidose container 24 constant. Thus, our above stated conditions for proportionality still hold.

The radioactive gas is most commonly packaged in a standard commercially available multidose glass container of 25 cc volume. This container is of the type shown at 24 in FIG. 1 and is sealed with a buytl rubber septum and aluminum crimp ring 32. The container 24 is locked within a cylindrical lead shield 28 with a lock washer 36 such that it always maintains its geometrical position. The lead shield 28 has a small hole through the center of the top for access to the rubber septum of the multidose container 24, and a removable bottom lead cover. When the bottom cover is removed, the cylindrical lead shield 28 fits precisely into a plastic positioning ring 22 which maintains the multidose container 24 in a fixed geometrical location above radiation detector 14 as shown in the drawings. In the present invention, the entire end of the multidose container 24 is thus exposed to the detector 14, however depending upon the sensitivity of the detector used in relation to source strength, a smaller area could be used.

The radiation detector 14 used in the present embodiment is an ionization chamber measuring 3½ inches in diameter by 1½ inches high. It is hermetically sealed to eliminate changes in sensitivity due to pressure, temperature changes and moisture effects; and with the exception of its gamma-ray entry port, is enclosed with lead shielding.

Alternative method of radiation detection such as a Geiger-Mueller tube or scintillation detector could be used as well without changing the scope of this invention.

Circuitry used for amplifying the proportional signal information received from the detector 14 makes use of an ultra high input resistance electrometer circuit with features which allows a zero reference point to be checked and established with the radiation source container 24 in place above the detector 14. A single switch 38 provides "on/off" function, battery check, instrument zero, and read positions.

The preferred embodiment of this invention incorporates a display meter 40 which indicates both radioactivity in the multi-dose container 24 and volume required for withdrawal of a 10 millicure dose. Additionally, a Dose Volume Chart (FIG. 3) is provided, which gives finer gradations than space permits on the face of meter 40 and another column is also provided for 20 millicure doses.

An alternate mode of information display could be in the form of a digital readout. Other forms of display could be used as well without changing the scope of this invention.

The preferred embodiment of this invention incorporates a battery pack consisting of 2 each 1.5 volt "D" cells and 1 each 22.5 volt battery as a source of power. This power source was selected rather than 115 V.A.C. as a preferred embodiment because of compactness, and so that the apparatus can be placed anywhere desired in the radioisotope laboratory without regard to the proximity of an A.C. outlet.

A shielded valve means, which in this embodiment is a valve assembly 26 consists of a valve 42 and syringe needle 30 attached to a plastic end-cap 44 which fits snugly over the upper end of a multidose container shield 28. In addition to holding the valve 42 and needle 30 in lace, the plastic end-cap 44 also aligns the needle 30 so that it accurately goes through the small hole in the top of the shield 28, and penetrates the rubber septum of the multidose container 24. Lead shielding for gamma rays emitting from the small hole through which the needle was inserted is provided in the form of a flip-lid 46 centered over the valve 42. This lead shield, flip-lid 46, pivots backwards when access to the valve 42 is needed for dose withdrawal. It also provides a safety feature in that a rubber bumper will not allow it to seat itself properly over the valve 42 unless the valve 42 is in the closed position. For purposes of cleanliness, the entire valve assembly 26 may be autoclaved, and the syringe needle is replaceable as required.

I claim:

1. An apparatus for directly determining the volume of a radioactive gas to be withdrawn from a radiation-shielded closed container such that withdrawn volume will constitute a predetermined dose of radioactivity, the determination and withdrawal of the desired amount of radioactive gas being accomplished without removing the closed container from its radiation shield, said apparatus comprising, in combination:

(a) radiation-shielded means for containing radioactive gas, the radioactive gas producing gamma radiation corresponding to the dosage of radioactivity in said radiation-shielded means;

(b) shielded-valve means in operable association with said radiation-shielded means for containing radioactive gas, the shielded-valve means being adapted for withdrawal of a predetermined volume of radioactive gas from said radiation-shielded means for containing radioactive gas;

(c) radiation-detection means in operable association with said radiation-shielded means for converting said gamma radiation into an electronic signal indicative of the amount of radioactivity in said radiation-shielded means;

(d) display means for displaying the amount of the radioactive gas in the radiation-shielded closed container at any given time;

(e) display means for displaying the volume of radioactive gas required to be withdrawn from the radiation-shielded closed container to provide a predetermined dose; and (f) means for amplification of the electrical signal from said radiation-detection means.

2. The apparatus of claim 1 above, further comprising a positioning ring to facilitate positioning of said radiation-shielded means for containing radioactive gas in place above said radiation detection means.

3. The apparatus of claim 2 above, further comprising power supply means for providing electrical power to operate said means for amplification of the electrical signal and the means for displaying the amount of radioactive bas being withdrawn.

4. The apparatus of claim 3 above, wherein the radiation-detection means comprises an ionization chamber.

5. The apparatus of claim 3 above, wherein the radiation-detection means comprises a Geiger-Meuller tube.

6. The apparatus of claim 3 above, wherein the radiation-detection means comprises a scintillation detector.

7. The apparatus of claim 3 above, wherein the radiation-detection means comprises a solid-state detector.

8. The apparatus of claim 1 above, wherein the display means comprises an analog meter display and charts for providing radiation dose-volume relationships information.

9. The apparatus of claim 3 above, wherein the display means comprises a digital voltmeter display and charts for providing radiation dose-volume relationships information.

10. The apparatus of claim 3 above, wherein the display means comprises a cathode-ray tube display and charts for providing radiation dose-volume relationships information.

11. An apparatus for directly determining the volume of a radioactive gas to be withdrawn from a radiation-shielded closed container such that withdrawn volume will constitute a predetermined dose of radioactivity, the determination and withdrawal of the desired amount of radioactive gas being accomplished without removing the closed container from its radiation shield, said apparatus comprising, in combination:

(a) radiation-shielded means for containing radioactive gas, the radioactive gas producing gamma radiation corresponding to the dosage of radioactivity in said radiation-shielded means;

(b) shielded-valve means in operable association with said radiation-sheilded means for containing radioactive gas, the shielded-valve means being adapted for withdrawal of a predetermined volume of radioactive gas from said radiation-shielded means for containing radioactive gas;

(c) radiation-detection means in operable association with said radiation-shielded means for converting said gamma radiation into an electronic signal indicative of the amount of radioactivity in said radiation-shielded means;

(d) display means for displaying the amount of radioactive gas in the radiation-shielded closed container at any given time, said display means comprising an analog meter display and charts for providing radiation dose-volume relationships information;

(e) display means for displaying the volume of radioactive gas required to be withdrawn from the radiation-shielded closed container to provide a predetermined dose; and (f) means for amplification of the electrical signal from said radiation-detection means.

12. An apparatus for directly determining the volume of a radioactive gas to be withdrawn from a radiation-shielded closed container such that withdrawn volume will constitute a predetermined dose of radioactivity, the determination and withdrawal of the desired amount of radioactive gas being accomplished without removing the closed container from its radiation shield, said apparatus comprising, in combination:

(a) radiation-shielded means for containing radioactive gas, the radioactive gas producing gamma radiation corresponding to the dosage of radioactivity in said radiation-shielded means;

(b) shielded-valve means in operable association with said radiation-sheilded means for containing radioactive gas, the shielded-valve means being adapted for withdrawal of a predetermine volume of radioactive gas from said radiation-shielded means for containing radioactive gas;

(c) radiation-detection means in operable association with said radiation-shielded means for converting said gamma raidiation into an electronic signal indicative of the amount of radioactivity in said radiation-shielded means;

(d) display means for displaying the amount of radioactive gas in the radiation-shielded closed container at any given time, said display means comprising an analog meter display and charts for providing radiation dose-volume relationships information;

(e) display means for displaying the volume of radioactive gas required to be withdrawn from the radiation-shielded closed container to provide a predetermined dose;

(f) means for amplification of the electrical signal from said radiation-detection means; and (g) a positioning ring to facilitate positioning of said radiation-sheilded means for containing radioactive gas in place above said radiation detection means.

* * * * *